(12) United States Patent
Wang et al.

(10) Patent No.: US 9,165,106 B2
(45) Date of Patent: Oct. 20, 2015

(54) LAYOUT DESIGN FOR ELECTRON-BEAM HIGH VOLUME MANUFACTURING

(71) Applicant: Taiwan Semiconductor Manufacturing Co. Ltd., Hsin-Chu (TW)

(72) Inventors: Hung-Chun Wang, Taichung (TW); Shao-Yun Fang, Taipei (TW); Tzu-Chin Lin, Hsinchu (TW); Wen-Chun Huang, Tainan (TW); Ru-Gun Liu, Zhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/611,331

(22) Filed: Feb. 2, 2015

(65) Prior Publication Data

US 2015/0149969 A1    May 28, 2015

Related U.S. Application Data

(63) Continuation of application No. 13/657,992, filed on Oct. 23, 2012, now Pat. No. 8,949,749.

(51) Int. Cl.
G06F 17/50    (2006.01)

(52) U.S. Cl.
CPC ........ *G06F 17/5081* (2013.01); *G06F 17/5068* (2013.01); *G06F 2217/06* (2013.01); *G06F 2217/12* (2013.01)

(58) Field of Classification Search
CPC .... G03F 1/78; G03F 1/2059; H01L 21/28123
USPC .......................................................... 716/52
See application file for complete search history.

(56) References Cited

U.S. PATENT DOCUMENTS 5,189,306 A * 2/1993 Frei ............................ 250/492.2
5,294,800 A * 3/1994 Chung et al. ............. 250/492.22

(Continued)

OTHER PUBLICATIONS

Non-Final Office Action dated Jul. 19, 2013 for U.S. Appl. No. 13/657,992.

(Continued)

*Primary Examiner* — Suchin Parihar
(74) *Attorney, Agent, or Firm* — Eschweiler & Associates, LLC

(57) ABSTRACT

The present disclosure relates to a method and apparatus to create a physical layout for electron-beam lithography, comprising defining a layout grid for a physical design, the layout grid further comprising vertical grid lines which coincide with stitching lines resulting from partitioning the physical design into a plurality of subfields. The physical design is assembled in accordance with design restrictions regarding interaction between design shapes and the layout grid. In some embodiments, the design restrictions are realized though layout restrictions. In some embodiments, the design restrictions are realized by shifting standard cells to minimize design shape interaction with the layout grid in a post-layout step. In some embodiments, the design restrictions are realized by exchanging positions between a plurality of standard cells for an exchange permutation which minimizes the number of interactions in a post-layout step. In some embodiments a routing grid is refined to rule out interactions between a subset of design constructs and the layout grid. Remaining design shape placement is then optimized along the routing grid relative to the stitching lines.

20 Claims, 13 Drawing Sheets

(56) References Cited

U.S. PATENT DOCUMENTS

| | | | |
|---|---|---|---|
| 5,416,720 A | 5/1995 | Fukui | |
| 5,621,216 A * | 4/1997 | Clarke et al. | 250/492.22 |
| 5,905,267 A * | 5/1999 | Muraki | 250/492.22 |
| 6,047,116 A * | 4/2000 | Murakami et al. | 716/54 |
| 6,162,581 A * | 12/2000 | Nakasuji et al. | 430/296 |
| 6,319,642 B1 * | 11/2001 | Hara et al. | 430/30 |
| 6,370,673 B1 | 4/2002 | Hill | |
| 6,546,543 B1 | 4/2003 | Manabe et al. | |
| 7,259,373 B2 * | 8/2007 | Zani et al. | 250/309 |
| 7,993,813 B2 * | 8/2011 | Scott et al. | 430/296 |
| 8,468,473 B1 | 6/2013 | Wang et al. | |
| 8,562,216 B2 * | 10/2013 | Kendall et al. | 383/207 |
| 8,609,308 B1 | 12/2013 | Chen et al. | |
| 8,759,885 B1 | 6/2014 | Jain et al. | |
| 8,949,749 B2 * | 2/2015 | Wang et al. | 716/55 |
| 2002/0102055 A1 | 8/2002 | Zweiback et al. | |
| 2003/0017401 A1 * | 1/2003 | Kawata et al. | 430/5 |
| 2004/0086786 A1 * | 5/2004 | Tzu et al. | 430/5 |
| 2005/0274911 A1 * | 12/2005 | Aloni et al. | 250/492.22 |
| 2006/0119827 A1 | 6/2006 | Sewell | |
| 2008/0073588 A1 | 3/2008 | Kruit et al. | |
| 2008/0171291 A1 | 7/2008 | Imai et al. | |
| 2009/0319978 A1 * | 12/2009 | Gleason et al. | 716/21 |
| 2010/0205577 A1 * | 8/2010 | Lu et al. | 716/21 |
| 2011/0226968 A1 * | 9/2011 | Platzgummer | 250/492.3 |
| 2013/0174106 A1 * | 7/2013 | Hsu et al. | 716/55 |
| 2013/0323648 A1 | 12/2013 | Chen et al. | |
| 2014/0027798 A1 | 1/2014 | Sato et al. | |
| 2014/0099582 A1 | 4/2014 | Chen et al. | |
| 2014/0115546 A1 * | 4/2014 | Wang et al. | 716/55 |
| 2014/0229904 A1 | 8/2014 | Fujimura et al. | |

OTHER PUBLICATIONS

Non-Final Office Action dated Jan. 9, 2014 for U.S. Appl. No. 13/657,992.
Final Office Action dated Jul. 8, 2014 for U.S. Appl. No. 13/657,992.
Notice of Allowance dated Sep. 19, 2014 for U.S. Appl. No. 13/657,992.

* cited by examiner

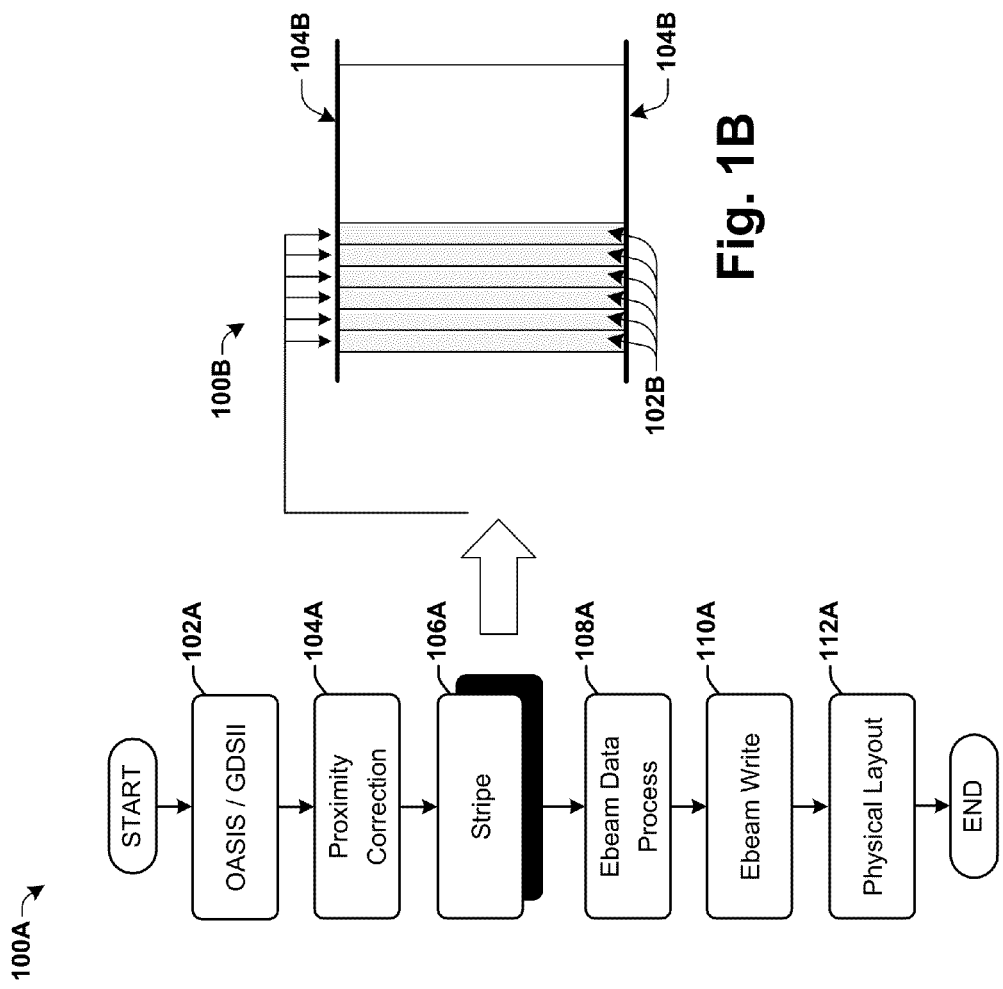

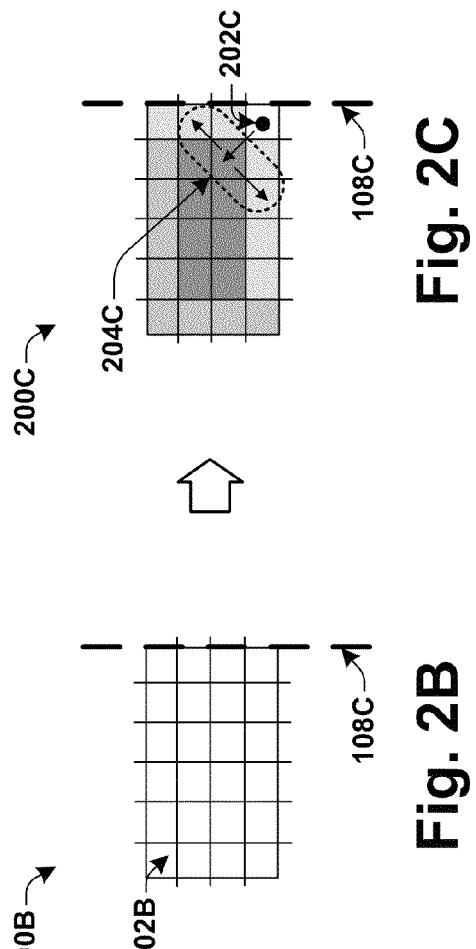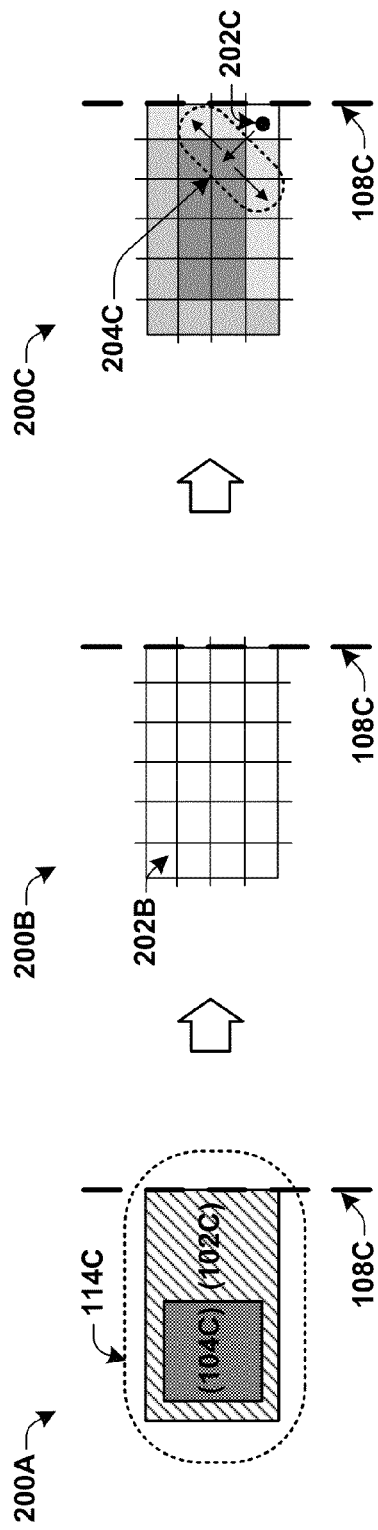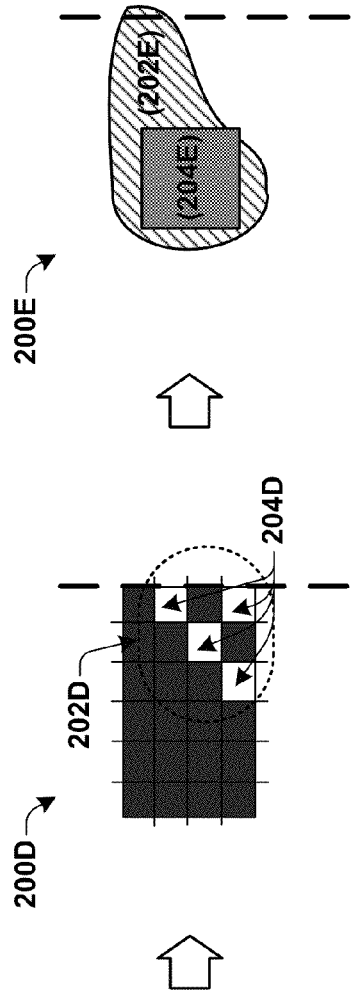
Fig. 2A  Fig. 2B  Fig. 2C  Fig. 2D  Fig. 2E

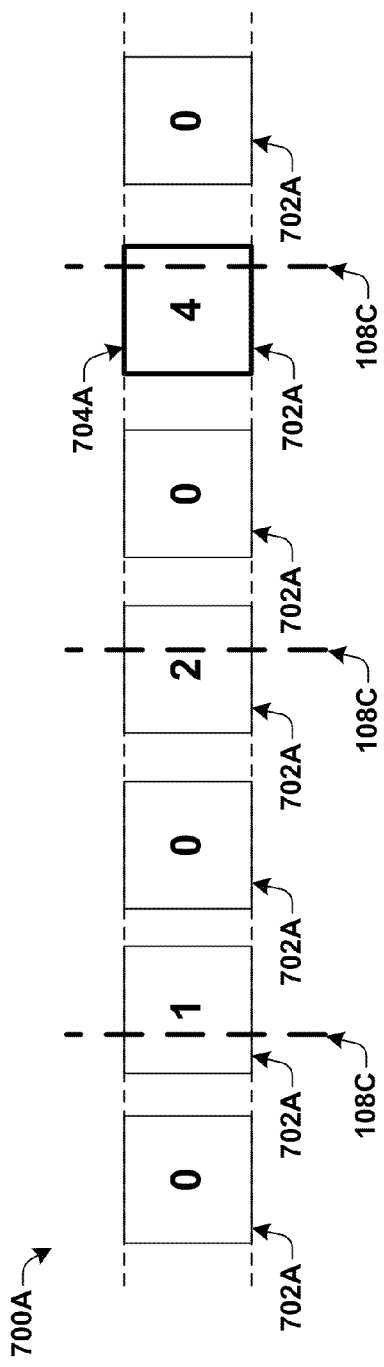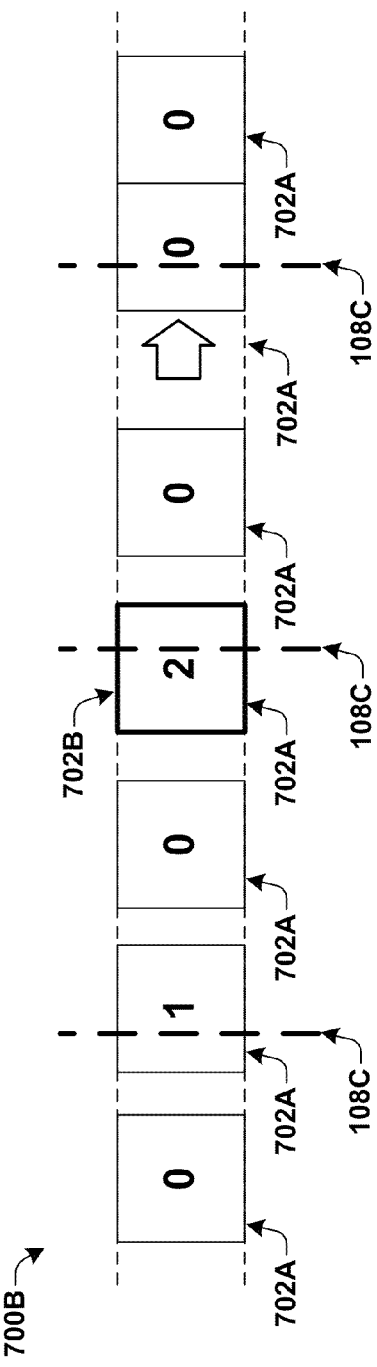

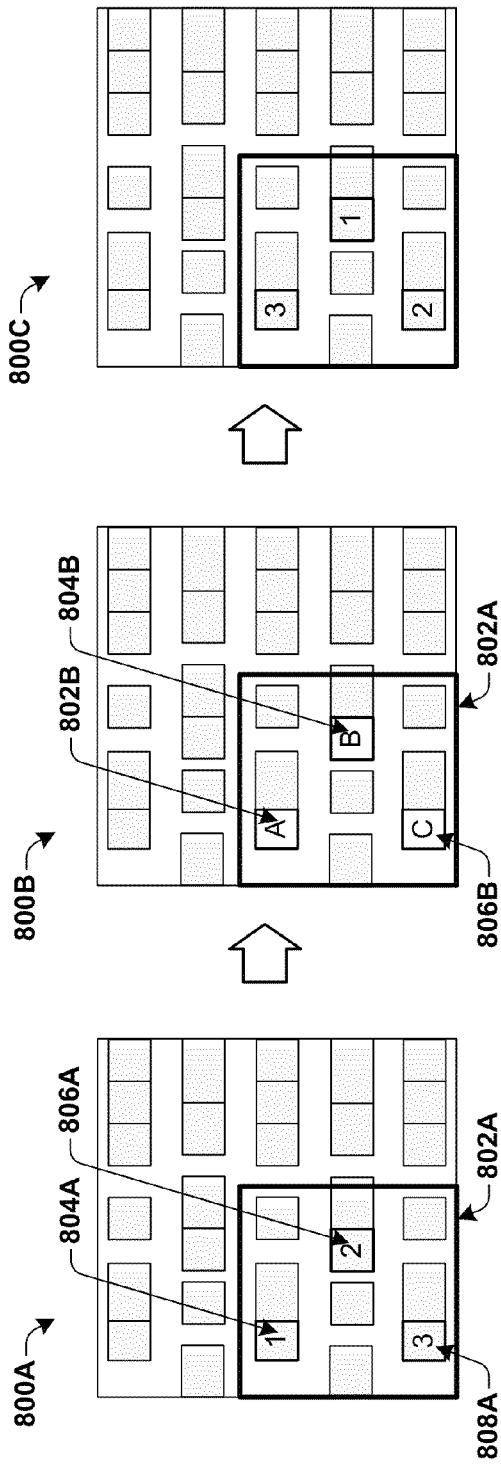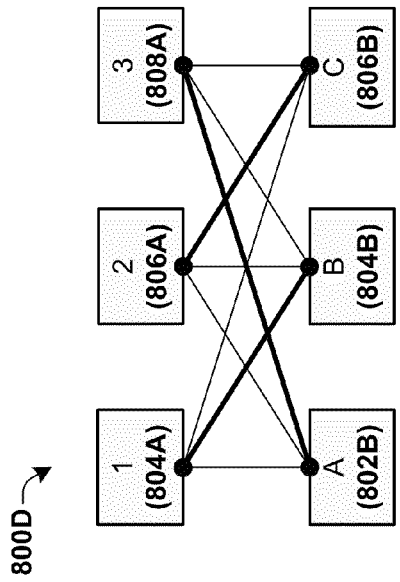
Fig. 8C
Fig. 8B
Fig. 8A
Fig. 8D

LAYOUT DESIGN FOR ELECTRON-BEAM HIGH VOLUME MANUFACTURING

REFERENCE TO RELATED APPLICATION

This application is a continuation of U.S. application Ser. No. 13/657,992 filed on Oct. 23, 2012, and the contents of which are incorporated by reference in their entirety.

BACKGROUND

Electron-beam (Ebeam) lithography utilizes a focused beam of electrons to selectively pattern a wafer directly for electron-beam direct write (EDW), but may also be employed to pattern a photomask for optical photolithography. Ebeam lithography offers an increased patterning resolution over optical photolithography by utilizing an Ebeam with electron energies on the order of approximately 5 keV-100 keV, resulting in wavelengths less than that of light, and is only limited by diffraction by an electron optics slit though which the beam of electrons is passed. However, Ebeam lithography has limited throughput compared to optical photolithography as an Ebeam writer forms shapes of a pattern in a serial manner, whereas optical photolithography forms a forms shapes of a pattern in parallel manner. This makes optical photolithography more suitable for high-volume manufacturing.

BRIEF DESCRIPTION OF THE DRAWINGS

FIGS. 1A-1C illustrate some embodiments of a data flow for electron-beam (Ebeam) patterning.

FIGS. 2A-2E illustrate some embodiments of defect formation when dithering a subminimum sized stitch-metal shape in an Ebeam patterning data flow.

FIGS. 7A-7B illustrate some embodiments of a method to minimize a total violation density value within a row of standard cells.

FIGS. 8A-8D illustrate some embodiments of a method to minimize a total violation density value within a checking tile.

DETAILED DESCRIPTION

Figure 1C:
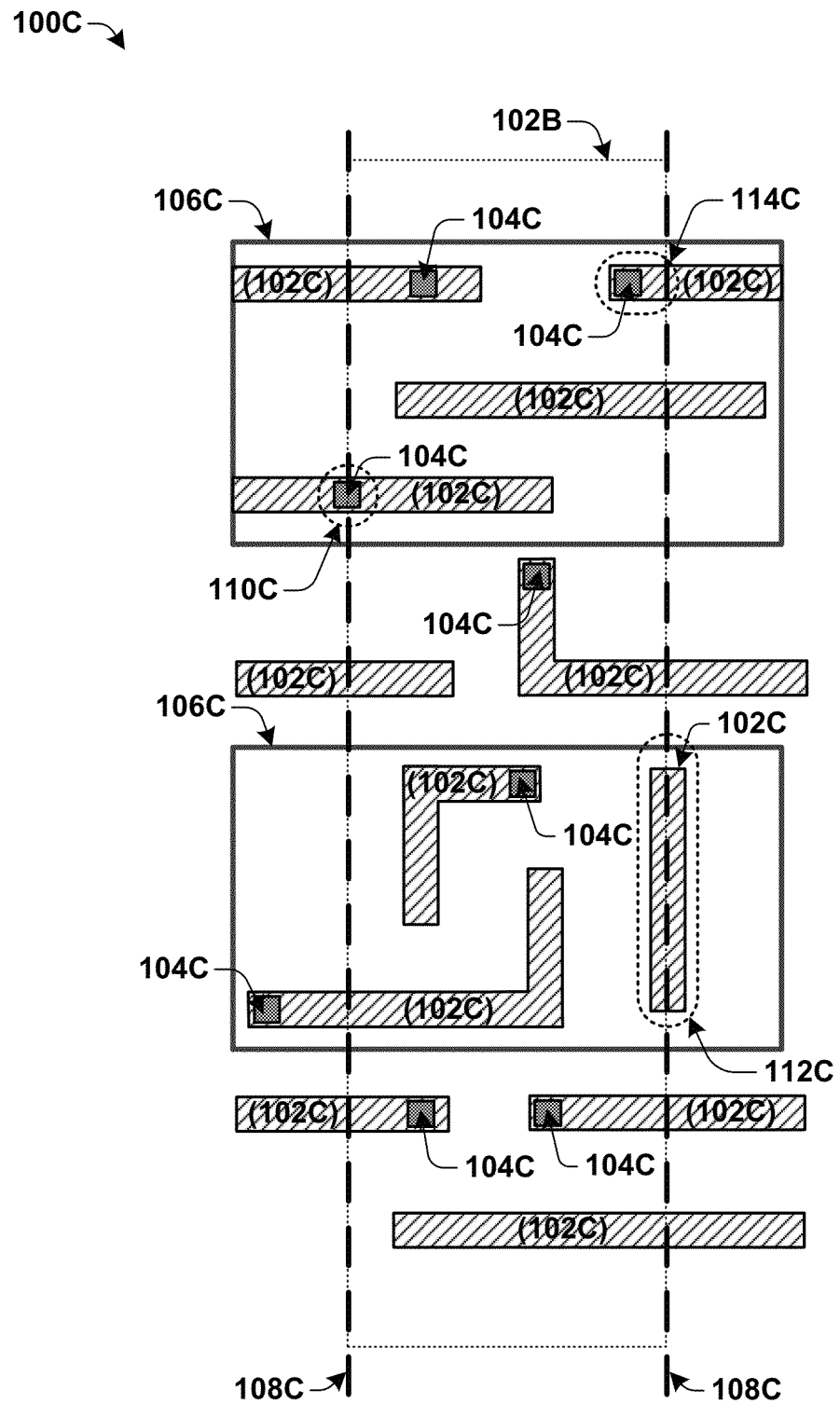

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

FIG. 1A illustrates some embodiments of a data flow for electron-beam (Ebeam) patterning. A physical design (e.g., GL1, OASIS, or GDSII) 102A is created using a physical design tool. The physical design 102A is subjected to an optical enhancement, wherein designed shapes of the physical design 102A are subjected to a proximity correction at 104A, adjusting edges of a respective designed shape so that the resultant shape formed on-wafer resembles the respective designed shape as closely as possible within lithographic limits. The physical design 102A is parsed into subfields, or "striped" at 106A, wherein a respective stripe spans an area between two outside edges of the physical design, and is narrow enough so that a stripe width can be written by an Ebeam patterning tool (e.g., Ebeam writer). The physical design 102A is converted into a data format at 108A which readable by the Ebeam writer. The Ebeam writer forms a pattern at 110A, the pattern comprising the designed shapes of the physical design 102A on a photomask for optical photolithography, or in resist on-wafer for EDW, resulting in an on-wafer physical layout 112A.

FIG. 1B illustrates some embodiments of partitioning a physical design 100B into a plurality of stripes 102B which abut one another and cover the entire physical design 100B. A respective stripe 102B spans an area between two outside edges 104B of the physical design 100B. For this type of partitioning, a physical design 100B of approximately 30 mm by 30 mm is partitioned into stripes for parallel writing by the Ebeam writer. State of the art Ebeam writers support "striping" widths of approximately 1 nm-10 nm.

FIG. 1C illustrates some embodiments of a detailed physical design 100C comprising a plurality of design shapes further comprising a plurality of metallization shapes 102C and a plurality of via interconnect shapes 104C. Some design shapes are located within a standard cell 106C from a library which had been previously defined for reuse. Other design shapes are located outside any standard cell 106C and are added at a level of design hierarchy other than the standard cell 106C, placed by a place and route tool to form connections between standard cells 106C, or both. The detailed physical design 100C further comprises a stripe 102B defined for EDW, wherein edges of the stripe 102B not coincident with an outside edge of the physical design 100C are defined as stitching lines 108C and serve as a boundary between two stripes 102B.

Design shapes which straddle a stitching line are subject to manufacturing defects, which can result in reduced yield, as the decomposition of the design 100C between two or more stripes 102B creates additional manufacturing overhead, because portions of the design shape are created at different times by the Ebeam writer and must subsequently be "stitched" together. "Stitching" of a decomposed shape may comprise an overlap area, or stitching area, wherein the portion of the design shape immediately surrounding the stitching line 108C is patterned twice by the Ebeam writer to assure that the shape is continuous. Manufacturing defects are particularly sensitive to design constructs such as via interconnect shapes 104C which straddle 110C a stitching line 108C and are subject to irregular metal topographies when landing on stitched metallization shapes 102C. A vertical metallization shape 102C bisected 112C by a stitching line 108C also generate a high number of defects due to large topographical and width variations. Manufacturing defects are also sensitive to a via interconnect shape 104C touching a stitch-metal shape with a size below a manufacturing minimum threshold 114C, wherein stitch-metal shape is defined as an intersection of a stripe 102B and a metallization shape 102C straddling a stitching line 108C.

Accordingly, the present disclosure relates to a method and apparatus to create a physical layout for electron-beam lithography, comprising defining a layout grid for a physical design, the layout grid further comprising vertical grid lines which coincide with stitching lines resulting from partitioning the physical design into a plurality of subfields. The physical design is assembled in accordance with design restrictions regarding interaction between design shapes and the layout grid. In some embodiments, the design restrictions are realized though layout restrictions. In some embodiments, the design restrictions are realized by shifting standard cells to minimize design shape interaction with the layout grid in a post-layout step. In some embodiments, the design restrictions are realized by exchanging positions between a plurality of standard cells for an exchange permutation which minimizes the number of interactions in a post-layout step. In some embodiments a routing grid is refined to rule out interactions between a subset of design constructs and the layout grid. Remaining design shape placement is then optimized along the routing grid relative to the stitching lines.

FIGS. 2A-2E illustrate some embodiments of defect formation when dithering a subminimum sized stitch-metal shape 114C in an Ebeam patterning data flow. FIG. 2A illustrates some embodiments of a close-up view of the stitch-metal shape with a size below a manufacturing minimum threshold 114C. FIG. 2B illustrates some embodiments of a pixel rendering 200B of the stitch-metal shape of FIG. 2A comprising a plurality of pixels 202B which cover the stitch-metal shape of FIG. 2A. FIG. 2C illustrates some embodiments of a gray-level transformation 200C of the stitch-metal shape 114C into the pixels 202B of FIG. 2B. The gray-level transformation 200C also includes a proximity correction to the via interconnect shape 104C to model effects of the Ebeam writer: diffraction, shape biasing, corner-rounding, etc. A data processing error in the gray-level transformation 200C may introduce a defect 202C to a single pixel that can propagate 204C to adjacent pixels in that have not yet been processed through subsequent steps in the Ebeam patterning data flow. FIG. 2D illustrates some embodiments of a gray-level to black-and-white representation 200D of the stitch-metal shape 114C, wherein propagation of the defect 202C has resulted in a dithering error 202D, causing voids 204D to form in the black-and-white representation 200D. The dithering error 202D results in a malformed on-wafer metallization shape 202E the embodiments of FIG. 2E, when the Ebeam writer patterns the drawn metallization shape 102C of the subminimum sized stitch-metal shape 114C, resulting in a manufacturing defect comprising an open, short, void, etc.

Figure 3:
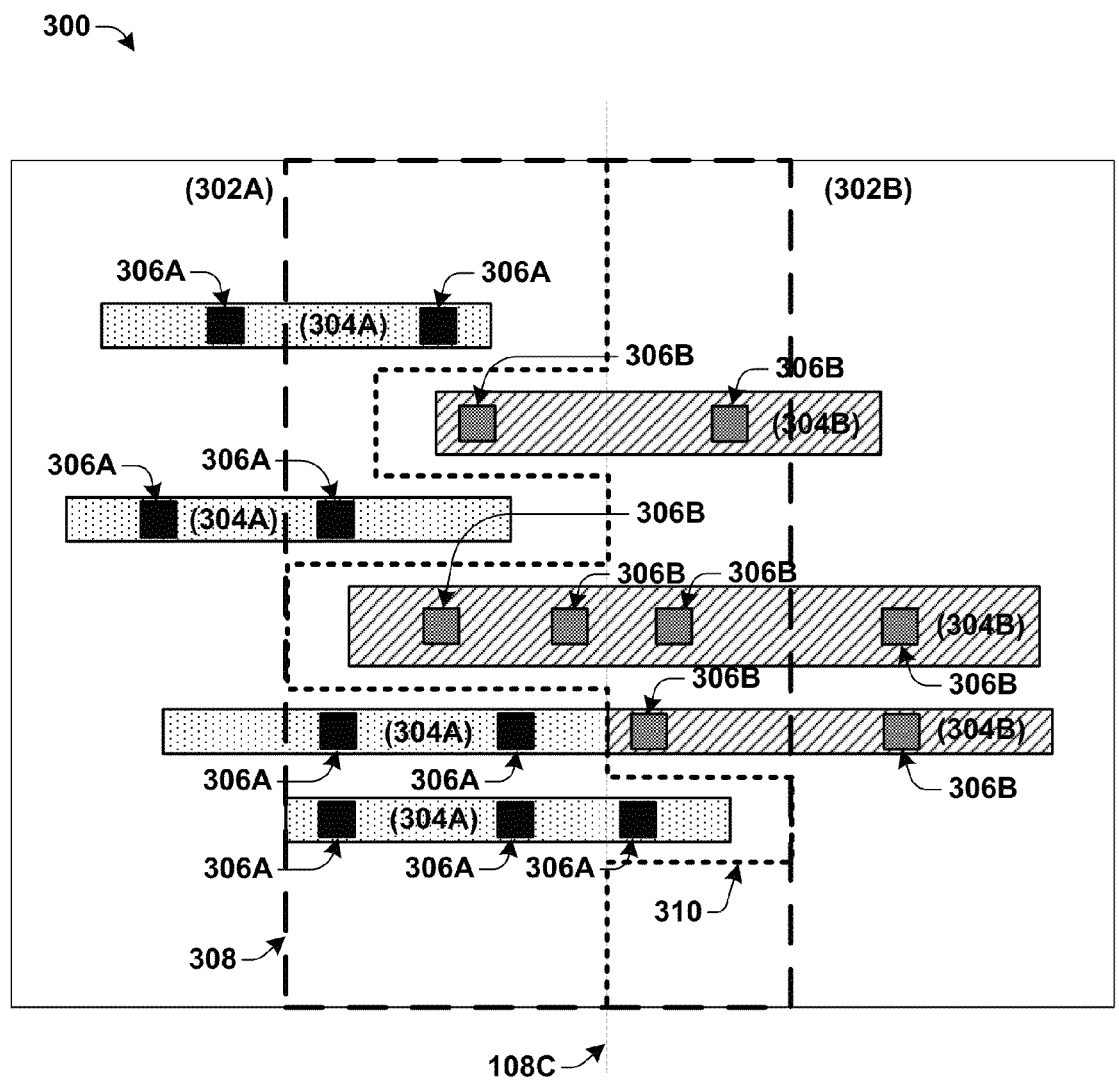
FIG. 3 illustrates some embodiments of overlay degradation for adjacent Ebeam patterning subfields containing a buffer region.

FIG. 3 illustrates some embodiments of overlay degradation for adjacent Ebeam patterning subfields containing a buffer region 300, comprising a first subfield 302A and a second subfield 302B. The first subfield 302A further comprises a first metallization layer subset 304A and a first via interconnect layer subset 306A. The second subfield 302B further comprises a second metallization layer subset 304B and a second via interconnect layer subset 306B. Each subfield is patterned separately, which comprises a single Ebeam writer at different times, and decreases throughput relative to optical lithography. Therefore it can be stated that the first subfield 302A is patterned by a first Ebeam and the second subfield 302B is patterned by a second Ebeam. Generally, different layers written by different Ebeams are subject to several types of patterning error, including: beam-to-beam position error on-wafer (i.e., overlay error), beam-to-beam defocus errors and variations, beam-to-beam current variation, and beam-to-beam magnification variation. The overlay error for beam-to-beam is twice that of a single beam.

The embodiments of FIG. 3 further comprise a buffer region 308, wherein a boundary 310 between the first subfield 302A and the second subfield 302B purposefully deviates from an each abutting a stitching line 108C to minimize a number of design shapes that are stitched between subfields. When performing subfield division for subfields separated by a stitching line 108C (i.e., rectangular subfields with straight-line boundaries), the layer above (i.e., the first via interconnect layer subset 306A, or the second via interconnect layer subset 306B, respectively) will obey the division rule from the layer below (i.e., first metallization layer subset 304A, or the second metallization layer subset 304B, respectively). In this instance the same subfield in different layers written by the same Ebeam minimizes the layer to layer overlay tolerance. However, the presence of the buffer region 308 and the (non straight-line) boundary 310 may break this rule, doubling the overlay error.

As such, some embodiments of the current invention comprise a formulation for optimizing patterning of adjacent subfields without any buffer region 308 and associated (non straight-line) boundary 310, such that a boundary between the first subfield 302A and second subfield 302B always comprises a stitching line 108C, eliminating the increased overlay error within the buffer region 308. To further minimize effects of the overlay error for design shapes that straddle the stitching line 108C, design restrictions comprising special design rules (e.g., a via interconnect landing rule or a short polygon rule), or an automated post-design modification of a layout (e.g., as a part of the proximity correction), or a combination thereof, are utilized to minimize a number of shapes that straddle the stitching line 108C to minimize a number of polygons cut by the stitching line 108C.

Figure 4:
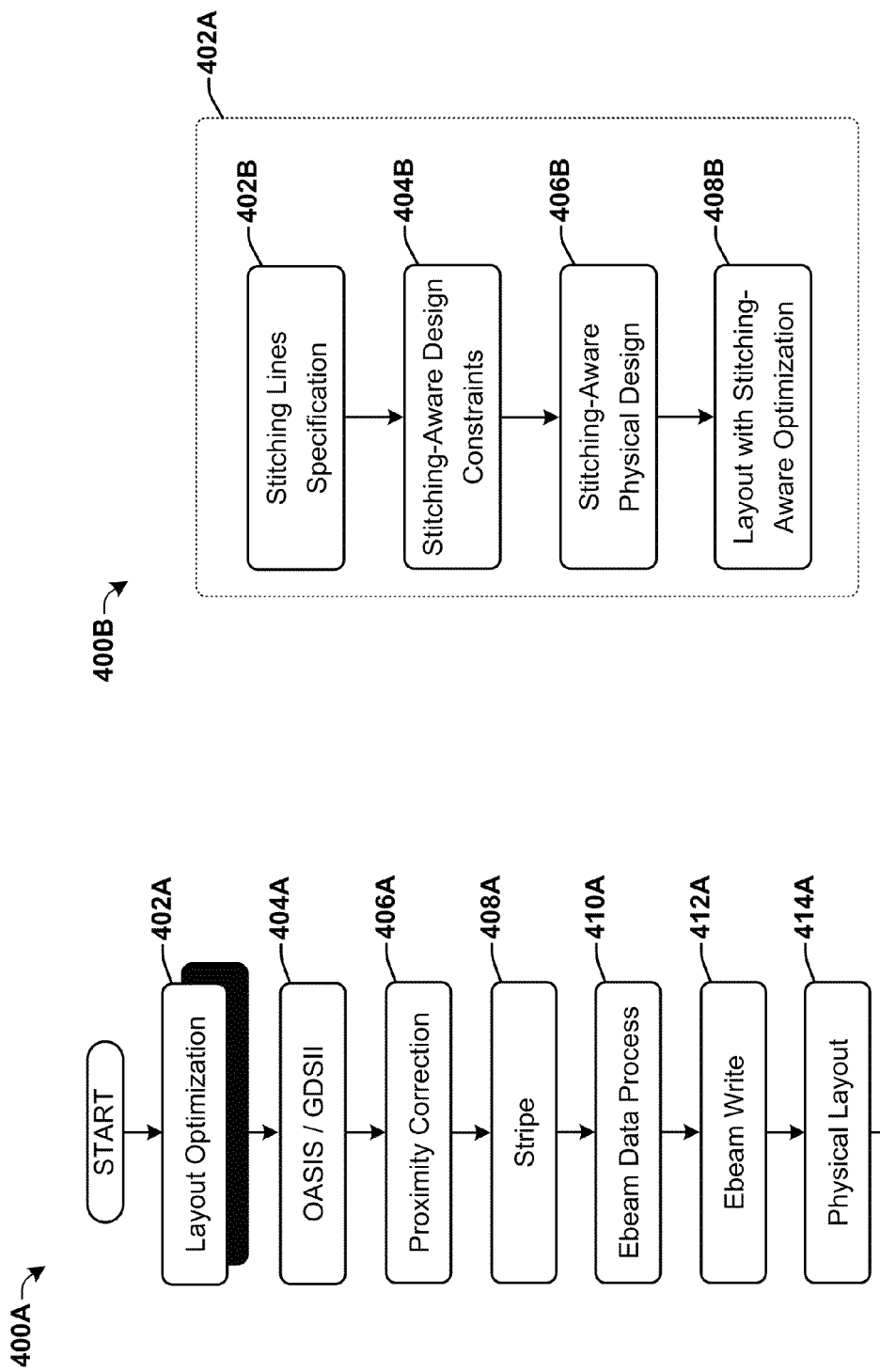
FIGS. 4A-4B illustrate a flow chart of some embodiments a method to create a physical layout for Ebeam lithography.

FIG. 4A illustrates a flow chart of some embodiments of a method 400A to create a physical layout for Ebeam lithography. While method 400A is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 402A layout optimization restrictions are put into place in accordance with minimization of design shapes that straddle stitching lines in a physical design. The layout optimization restrictions may comprise direct avoidance of the stitching line, a "keep out" region which outlaws placement of certain design constructs in a vicinity of a stitching line, or a combination thereof. These layout restrictions may directly enable on-wafer geometries as drawn, or enable a post-processing step that further modifies the shape for stitching line avoidance.

At 404A a physical design (e.g., GL1, OASIS, or GDSII) is created using a physical design tool, assembling a physical design by arranging a plurality of standard cells, and recognizing a partitioning of the physical design into a plurality of subfields through the layout optimization restrictions. The layout optimization restrictions will govern partitioning of the physical design, position of one or more standard cells, may drive redesign to one or more standard cells, or a combination thereof, to minimize a number of design shapes that straddle stitching lines dividing subfields. The design shapes comprise a plurality of metallization layers or a plurality of via interconnect layers.

At 406A the physical design is subjected to a proximity correction, adjusting edges of metallization layers or via interconnect layers so that the resultant on-wafer shape resembles the respective designed shape as closely as possible within lithographic limits.

At 408A the physical design is then parsed into subfields, or "striped" in accordance with the definition of 404A.

At 410A the physical design is converted into a data format which readable by an Ebeam writer.

At 412A the Ebeam writer forms a pattern comprising the designed shapes of the physical design. In some embodiments the pattern is formed on a photomask for optical lithography. In other embodiments the pattern is formed in resist on-wafer for EDW.

At 414A several subsequent manufacturing processing steps are performed comprising development of resist, filling with an interlayer dielectric, subsequent layer formation, etc., resulting in an on-wafer physical layout.

FIG. 4B illustrates a flow chart of some detailed embodiments of a method 400B to define stitching-aware layout optimization for Ebeam lithography. The method 400B improves upon some prior art approaches by advancing recognition of the subfield division and the stitching line formation to the physical design through the layout optimization restrictions, or by modeling the stitching lines directly in the design space. This allows for generation of layouts with stitching-aware optimization.

At 402B stitching line specifications are defined which define the size and location of subfields of a physical design based upon an overall footprint (i.e., size and shape) of the physical design. The stitching line specifications are also influenced by settings of the Ebeam writer and unit processes which are used to manufacture the physical layout.

At 404B stitching-aware design constraints are defined which may comprise specialized design rules, a design utility that shows a layout designer the position of stitching lines in the layout space, an automated post-design modification of the physical design, or a combination thereof.

At 406B a physical design is produced in accordance with the stitching-aware design constraints for standard cell placement and top level wiring of the physical design by a place and route tool.

At 408 a physical design with stitching aware optimization has been produced in accordance with the stitching-aware design constraints for subsequent processing comprising subfield division, Ebeam data conversion, Ebeam writing, and downstream manufacturing processes to produce a physical layout.

Figure 5:
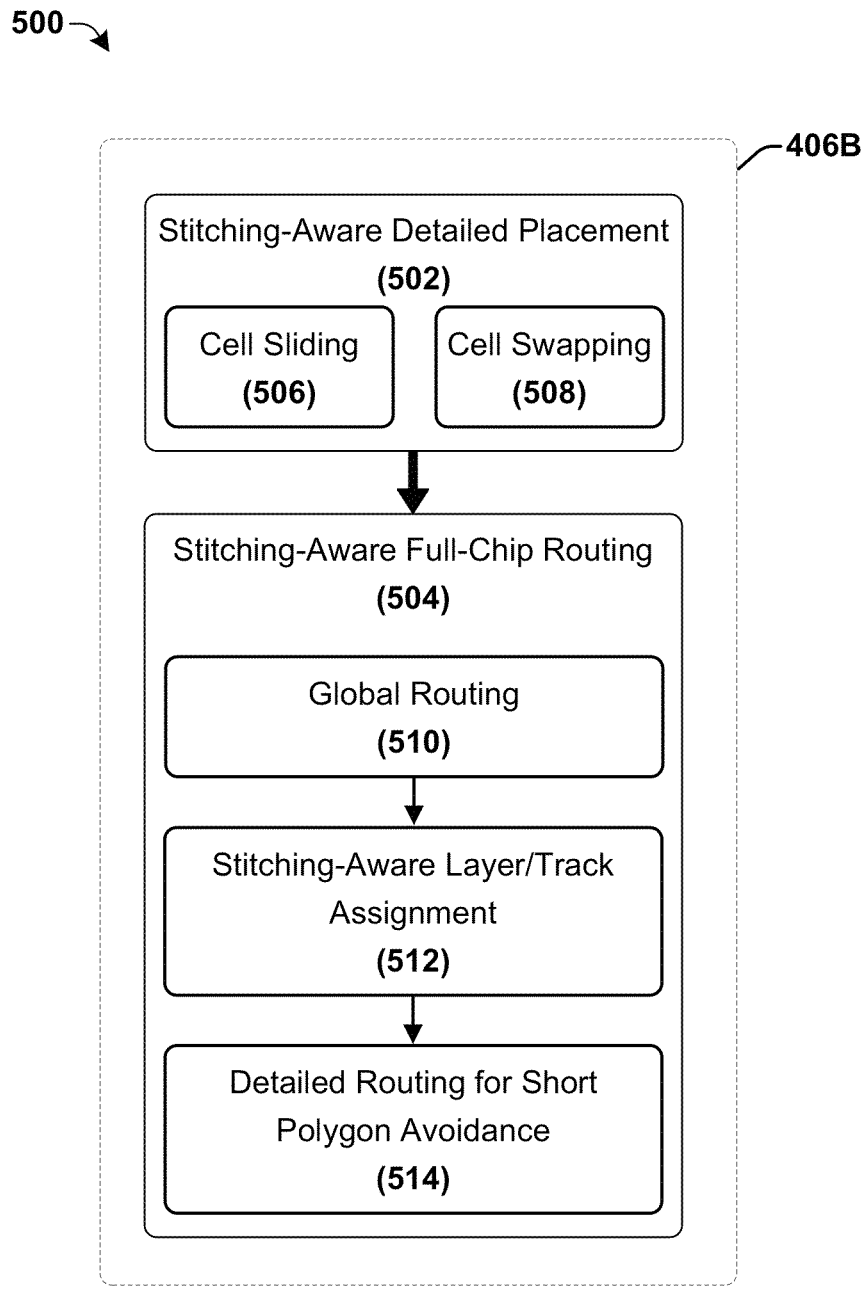
FIG. 5 illustrates a flow chart of some embodiments a method to create a stitching-aware physical layout for Ebeam lithography.

FIG. 5 illustrates a flow chart of some further embodiments of a method 500 to create a stitching-aware physical layout for Ebeam lithography. The embodiments of FIG. 5 comprise a detailed description of 406B for construction of a stitching-aware physical design. Moreover, various steps of the method 500 will be revisited in subsequent embodiments.

At 502 stitching-aware detailed placement of standard cells in a physical design is performed. The stitching-aware detailed placement comprises two steps which may be performed in an arbitrary order: standard cell sliding 506 and standard cell swapping 508. Cell sliding 506 comprises assembling a portion of a physical design by arranging the plurality of standard cells into rows, recognizing interaction between a subset of design constructs and a stitching line as defined in the stitching-aware design constraints, and moving a standard cell along a direction orthogonal to a stitching line (i.e., along a row) to reduce the interactions. Cell swapping 508 comprises exchanging positions of two or more standard cells to minimize these interactions.

At 504 stitching-aware full chip routing is performed to form connections between standard cells through placement of a plurality of shapes formed on a metallization layer, wiring the physical design (e.g., chip) up to bond pads, packaging, and the like. Stitching-aware full chip routing 504 is performed in three sequential steps: global routing 510, stitching-aware layer and track assignment 512, and detailed routing for short polygon avoidance 514. At 510 global routing of the physical design is performed on a course routing grid. This step may occur with little regard to stitching-aware design constraints, or may reorder subsequent steps to incorporate stitching-aware design constraints into router restrictions. At 512 stitching-aware layer and track assignment is performed to place design shapes on a track comprising a global grid that is an integer multiple of a design shape minimum pitch, while minimizing interaction of the design shapes with the stitching lines. In some embodiments the 512 stitching-aware layer and track assignment 512 is performed after a global routing result is obtained, adjusting a track grid about a metallization wiring topology. At 514 detailed routing for short polygon avoidance is performed, wherein the routing grid is refined to outlaw routing grid lines or routing grid points in accordance with the stitching-aware design constraints, and may comprise re-routing of the global routing result.

Figures 6A, 6B:
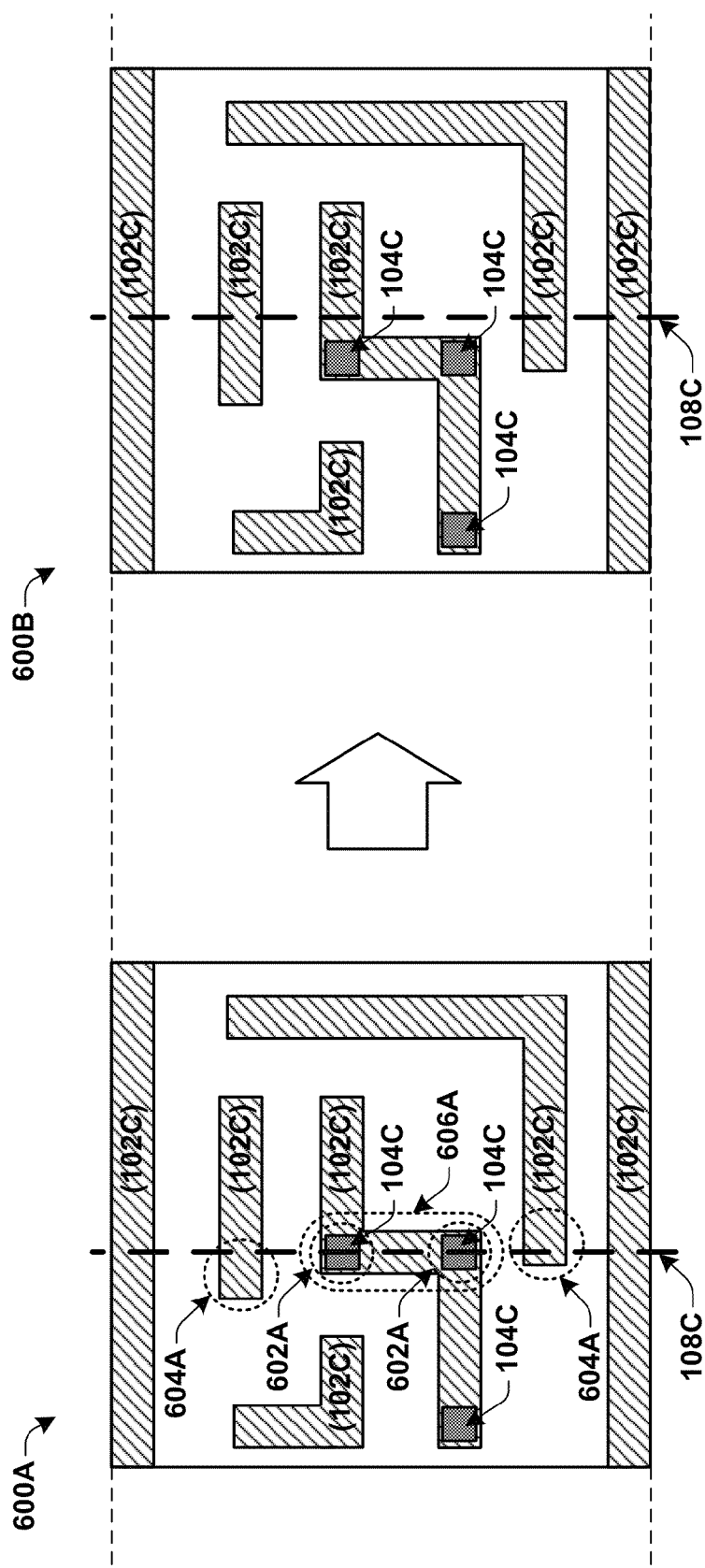
FIGS. 6A-6B illustrate some embodiments of a method to shift a standard cell relative to a stitching line to reduce a violation density value.

FIGS. 6A-6B illustrate some embodiments of a method to shift a standard cell relative to a stitching line to reduce a violation (e.g., cell sliding). FIG. 6A illustrates an embodiment of a standard cell 600A placed in a physical design, which intersects a stitching line 108C. The standard cell 600A comprises design shapes further comprising a plurality of metallization shapes 102C and a plurality of via interconnect shapes 104C. A first violation 602A is defined as a via interconnect shape 104C straddling a stitching line 108C. A stitch-metal shape is also defined as an intersection of a subfield and a metallization shape 102C straddling a stitching line, and a second violation 604A is defined as a subminimum sized stitch-metal shape (e.g., a stitch metal shape with a size below a minimum manufacturing threshold). A third violation density 606A is defined by a vertical metallization shape 102C bisected by a stitching line 108C.

FIG. 6B illustrates some embodiments of minimizing violation densities 600B, comprising shifting the standard cell 600A horizontally to avoid stitching line 108C interactions with design shapes to eliminate the first violations 602A, the second violations 604A, and the third violation 606A of the embodiments of FIG. 6A.

FIGS. 7A-7B illustrate some embodiments of a method to minimize a total violation density value within a row of standard cells (e.g., cell sliding). A first violation density value is defined within a standard cell as a number of via interconnect shapes within the standard cell straddling a stitching line. A second violation density value is defined within a standard cell as a number of subminimum sized stitch-metal shapes within the standard cell straddling a stitching line. A third violation density value within a standard cell as a number of vertical metallization shapes bisected by a stitching line. A violation density value for a standard cell is defined as a sum of the first violation density value, the second violation density value, and the third violation density value.

FIG. 7A illustrates some embodiments of minimizing a total violation density value for a row configuration 700A of standard cells 702A by standard cell sliding, wherein a total violation density value is defined as a sum of the violation density values for the standard cells 702A comprising the row configuration 700A. After determining the violation density value of each standard cell 702A the row configuration 700A, a first standard cell 704A comprising a largest violation density value (i.e., 4) is moved within a row along a direction orthogonal to a stitching line 108C to minimize the largest violation density value within the first standard cell 704A. FIG. 7B further illustrates some embodiments of minimizing a total violation density value for the row configuration 700A after movement of the first standard cell 704A, by selecting a second standard cell 702B comprising a second largest violation density value (i.e., 2) for movement within the row. The second standard cell 702B is then moved along a direction orthogonal to a stitching line to minimize the second largest violation density value.

FIGS. 8A-8D illustrate some embodiments of a method to minimize a total violation density value within a checking tile by standard cell swapping. FIG. 8A shows an arrangement of standard cells 800A, wherein a checking tile 802A is defined to cover portions of two or more rows of standard cells, including a first standard cell 804A in a first row, a second standard cell 806A in a second row, and a third standard cell 808A in a third row. FIG. 8B shows the arrangement of standard cells 800A, wherein the first standard cell 804A, the second standard cell 806A, and the third standard cell 808A have been removed to reveal a first location 802B, a second location 804B, and a third location 808B, respectively.

A numerical description is formulated for a resulting number of interactions formed between standard cells and stitching lines (e.g., the total violation density) in a given arrangement, and expanded to formulate the total violation density when exchanging positions between a plurality of standard cells of equal size for all possible exchange permutations (there are six possible permutations in the embodiments of FIGS. 8A-8D). The positions of the standard cells are then exchanged for an exchange permutation which minimizes the number of interactions, as arranged in FIG. 8C, wherein the first standard cell 804A is moved to the second location 804B, the second standard cell 806A is moved to the third location 808, and the third standard cell 808A is moved to the first location 802B.

FIG. 8D illustrates some embodiments of a minimization problem for the arrangement of the standard cells of the embodiments of FIG. 8C, comprising a bipartite graph 800D denoting interactions between a first set of shapes comprising the first standard cell 804A, the second standard cell 806A, and the third standard cell 808A and a second set of shapes comprising the first location 802B, the second location 804B, and the third location 808. The standard cells and locations form vertices of the bipartite graph 800D. Each pair of vertices is connected by an edge weighted by a total violation density value resulting from placing the standard cell at the location. A total of six edges corresponding to the possible permutations in the embodiments of FIGS. 8A-8D exist in the bipartite graph 800D. This minimization problem may then be solved by numerical methods to minimize a sum of total violation density values along all edges of the bipartite graph 800D to find an optimal swapping solution for placement of the standard cells from the first set of shapes in the locations from the second set of shapes.

For the embodiments of FIG. 8D the edge weighting of an edge formed between a standard cell and a location may be refined as a sum of a product of a first weighting factor and a first violation density value resulting from placing the standard cell at the location, a product of a second weighting factor and a second violation density value resulting from placing the standard cell at the location, and a product of a third weighting factor and a number of design shapes that straddle a stitching line.

Figures 9A, 9B:
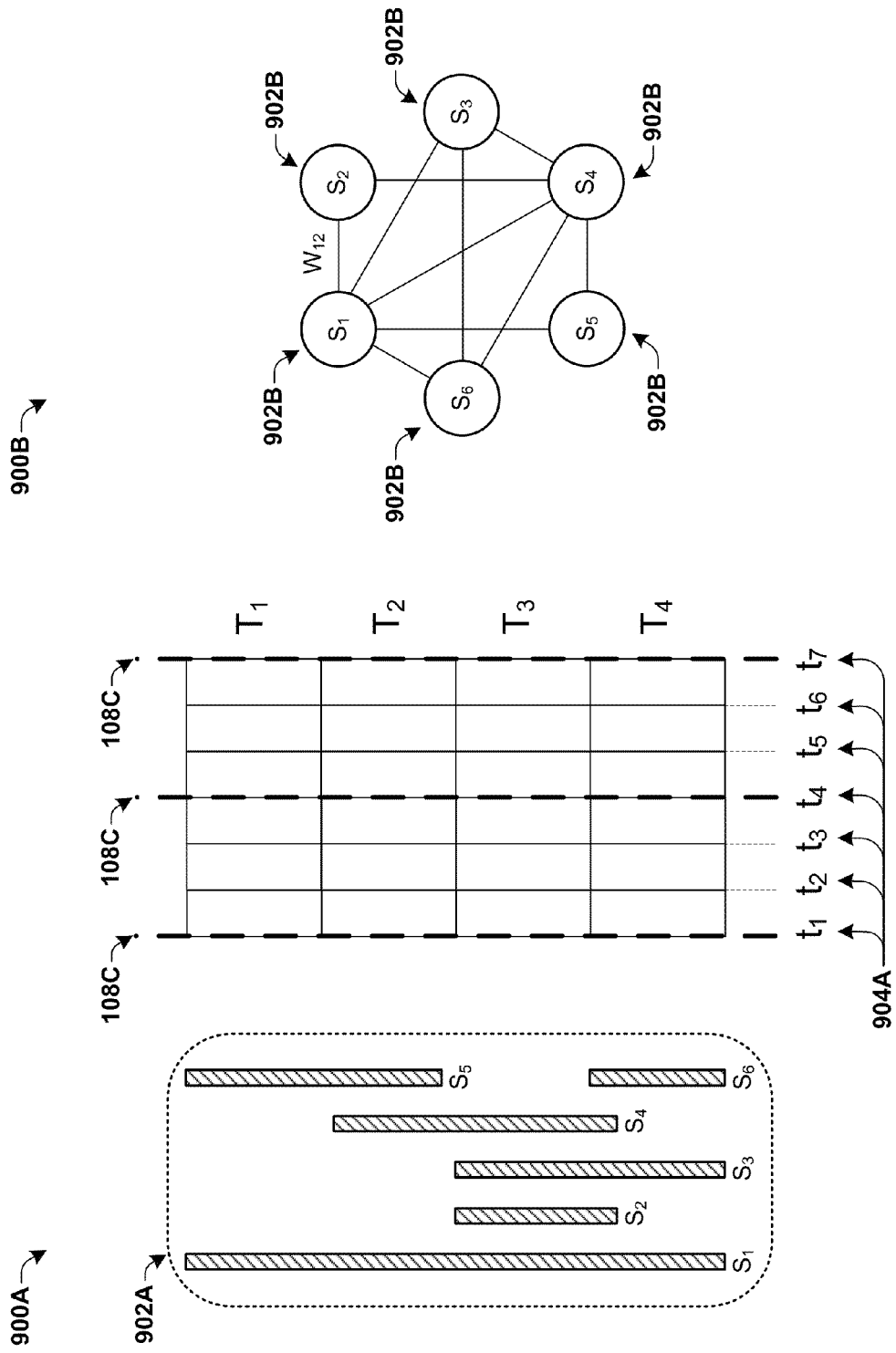
FIGS. 9A-9B illustrate some embodiments of a method to solve a minimization problem to determine placement of the plurality of shapes.

FIGS. 9A-9B illustrate some embodiments of a method to solve a minimization problem to determine placement of the plurality of design shapes. FIG. 9A illustrates a routing arrangement 900A, comprising a plurality of metallization shapes 902A, or segments $S_1$-$S_6$, which comprise a global routing wiring result. The routing arrangement 900A further comprises a routing grid comprising first vertical grid lines 904A spaced at integer multiples of the metallization shape 902A minimum pitch. A layout grid is further defined within the routing grid 900B comprising stitch-lines as second vertical grid lines 108C spaced at integer multiples of the metallization shape 902A minimum pitch, and wherein periodicity of the second vertical grid lines 108C is an integer multiple of periodicity of the first vertical grid lines 904A. The vertical routing grid and the layout grid are aligned resulting in coincidence between each first vertical grid line 904A and a respective second vertical grid line 108C. In some embodiments, first vertical grid lines 904A which are coincident with second vertical grid lines 108C are removed from the routing grid 900B to prevent patterning and manufacturing issues with via interconnect shapes straddling stitching lines 108C, subminimum sized stitch-metal shapes, and vertical metallization shapes bisected by a stitching lines.

FIG. 9B illustrates some embodiments of a vertical constraint graph 900B for the plurality of metallization shapes 902A, vertical constraint graph 900B comprising one vertex 902B for each shape and an edge formed between a first shape and a second shape which overlap in a horizontal direction (e.g., $W_{12}$ formed between $S_1$ and $S_2$, which overlap). Each edge of the vertical constraint graph 900B is weighting by a value proportional to a distance between the first shape and the second shape, and a minimization problem corresponding to the vertical constraint graph is solved to determine placement of the metallization shapes relative to the routing grid 900B to minimize total edge weight.

In some embodiments the routing arrangement 900A into a plurality of tiles $T_1$-$T_4$, wherein the plurality of metallization shapes 902A form connections between two or more standard cells. The vertical constraint graph 900B comprising vertices for each metallization shapes 902A and edges between vertices for shapes which overlap in the horizontal direction. The edges are weighting by a value of one-half raised to a value of a distance between the first shape and the second shape, and a minimization problem equivalent to the vertical constraint graph 900B is solved to determine placement of metallization shapes 902A.

Figure 10C:
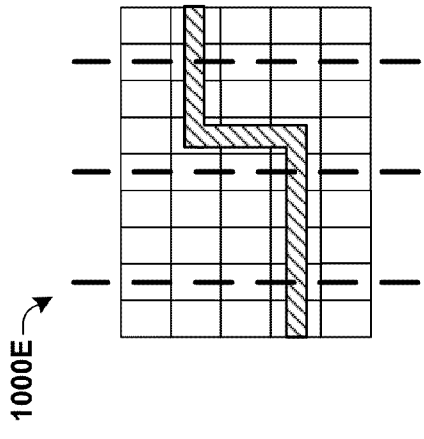
FIGS. 10A-10E illustrate some embodiments of routing grid line removal to avoid stitching lines.
Figure 10E:
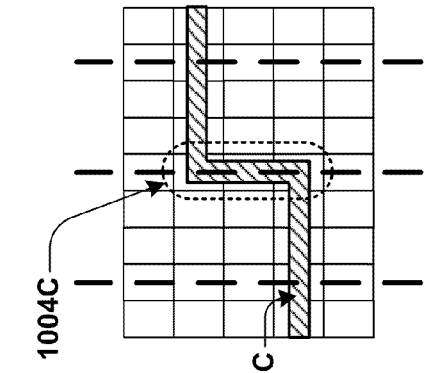
Figure 10B:
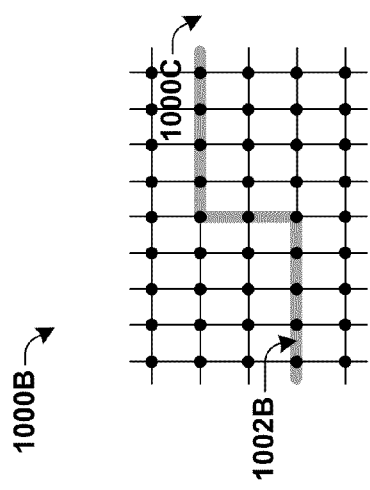
Figure 10D:
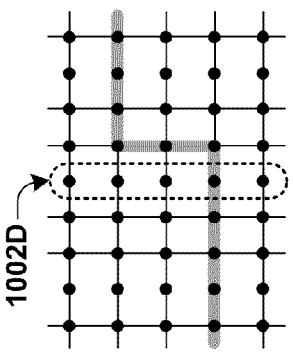
Figure 10A:
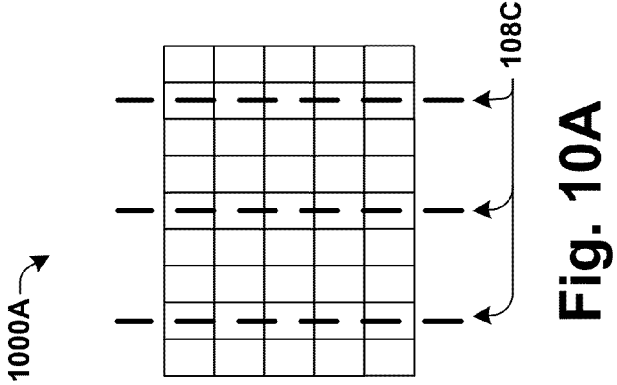

FIGS. 10A-10E illustrate some embodiments of routing grid line removal to avoid stitching lines. FIG. 10A illustrates some embodiments of a gridded layout 1000A with stitching lines 108C resulting from layout partitioning. FIG. 10B illustrates a routing grid 1000B corresponding to the gridded layout 1000A, wherein a line path 1002B is placed by a place and route tool along a legal set of grid coordinates. FIG. 10C illustrates some embodiments of a physical design 1000C derived from the routing grid 1000B and line path 1002B, wherein a stitching defect 1004C is formed on a vertical segment of a metallization layer 1002C derived from the line path 1002B. To prevent the stitching defect 1004C, the routing grid 1000B may be refined by removing vertical grid lines from the routing grid 1000B that overlap with stitching lines, as demonstrated in FIG. 10D. The resulting physical design 1000E of FIG. 10E no longer contains the stitching defect 1004C as the grid line along which the stitching defect 1004C had formed in FIG. 10C is no longer legal for routing.

Figure 11B:
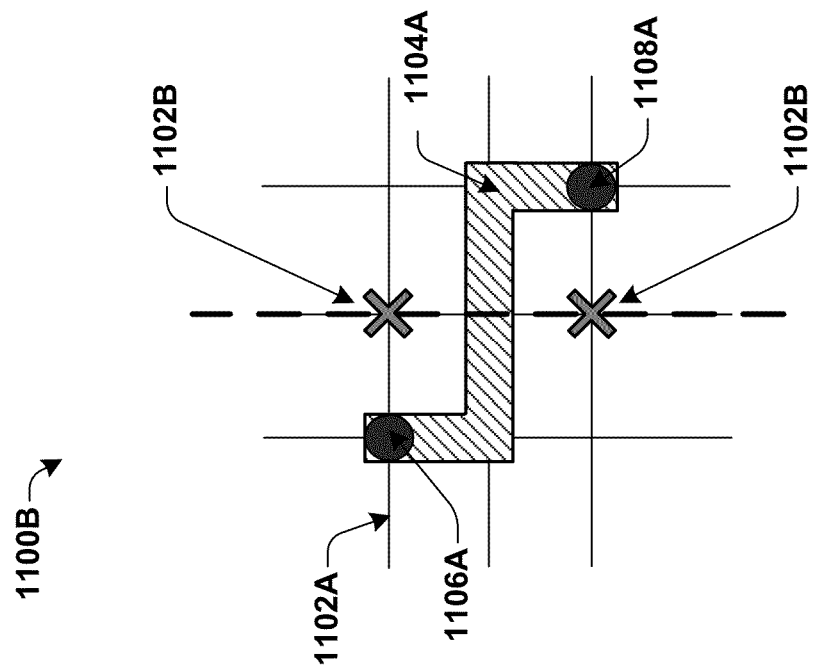
FIGS. 11A-11B illustrate some embodiments of routing grid point removal to avoid subminimum sized stitch-metal shapes.
Figure 11A:
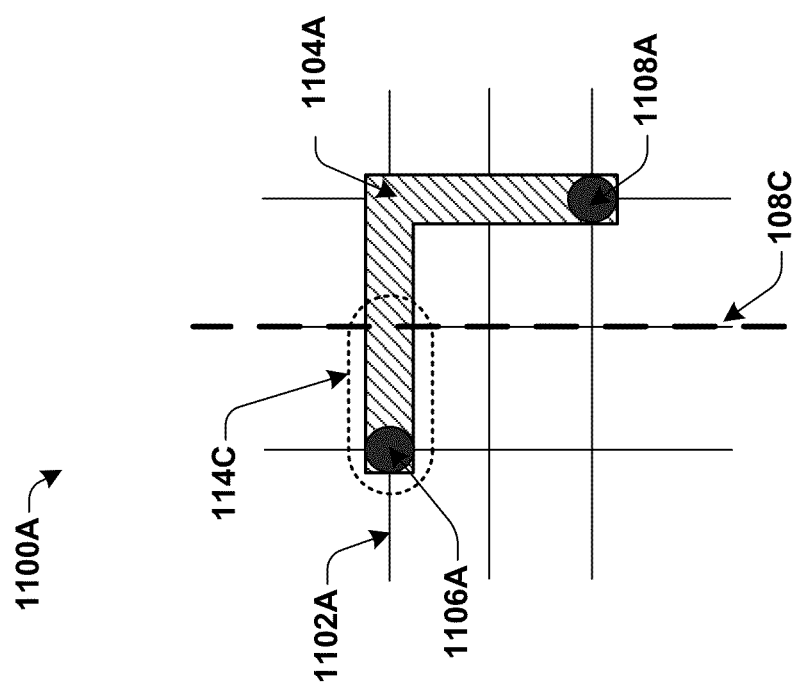

FIGS. 11A-11B illustrate some embodiments of routing grid point removal to avoid subminimum sized stitch-metal shapes. FIG. 11A illustrates some embodiments of a routing grid 1100A comprising grid lines 1102A which can form a routing path 1104A between a source pin 1106A and a target pin 1108A. A middle grid line of the routing grid 1100A is coincident with a stitching line 108C, resulting in a subminimum sized stitch-metal shape 114C. To avoid this, the embodiments of FIG. 11B refine the routing grid 1100A into a new routing grid 1100B by defining an intersection of the stitching 108C line and a routing grid line as an illegal point 1102B on the routing grid 1100B when the intersection is within a threshold number of routing grid points from the source pin 1106A or the target pin 1108A.

Figure 12:
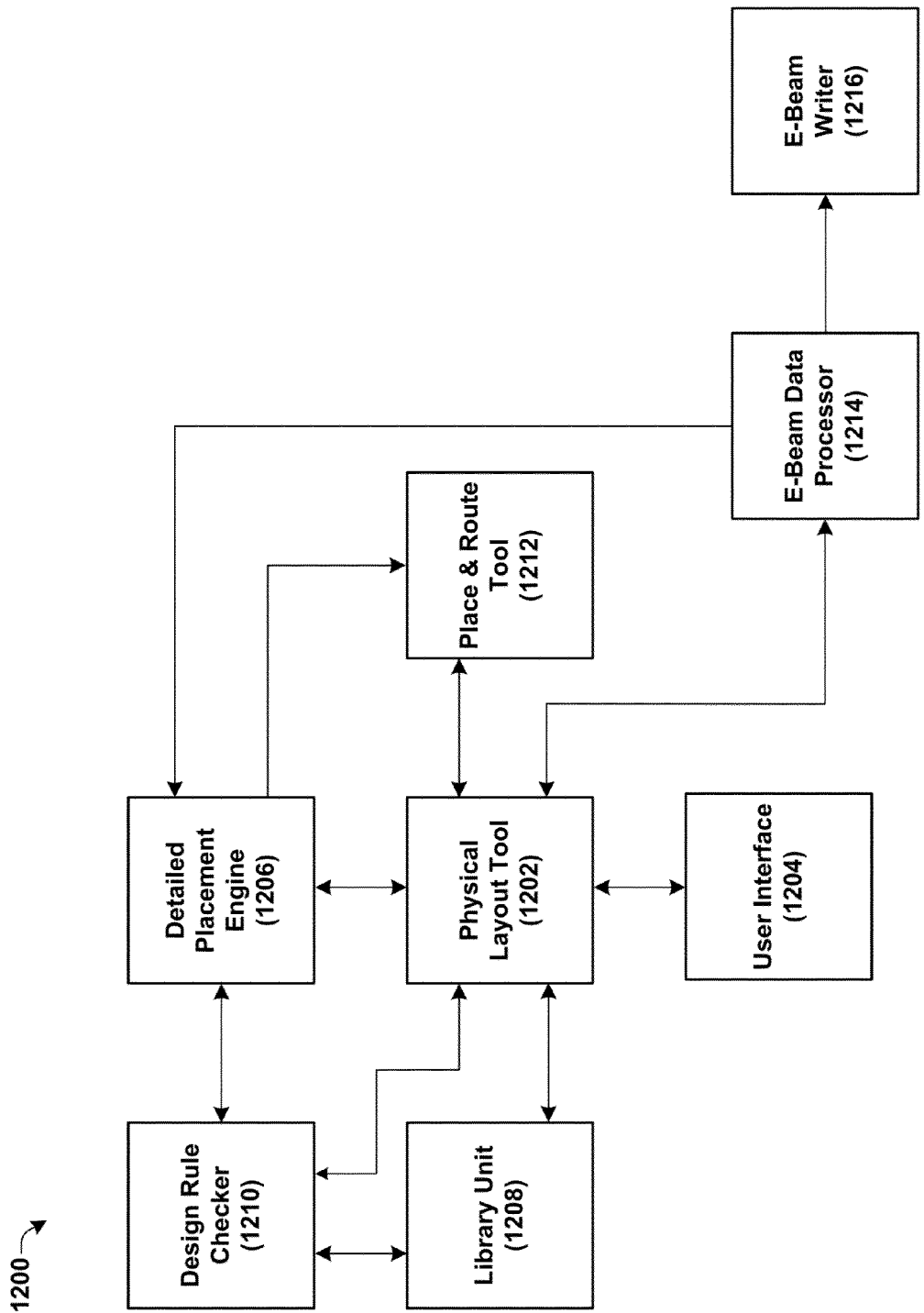
FIG. 12 illustrates some embodiments of a design tool configuration to create a physical layout for Ebeam lithography.

FIG. 12 illustrates some embodiments of a design tool configuration 1200 to create a physical layout for Ebeam lithography, comprising a physical design tool 1202 configured to create a physical design, a place and route tool 1212 coupled to the physical design tool 1202 and configured to place shapes within the physical design, and a detailed placement engine 1206 coupled to the physical design tool 1202 and the place and route tool 1212. The detailed placement engine 1206 is configured to optimize shape placement in the physical design tool 1202 by moving shapes according to physical design restrictions. The detailed placement engine 1206 is further configured to define shape placement by the place and route tool 1212 according to a layout grid in conjunction with physical design restrictions. A design rule checker 1210 is configured to check the physical design against a pre-defined set of layout restrictions, and communicate results of the check to the physical design tool to be accessed through a user interface 1204. The design rule checker 1210 may also communicate results of the check to the detailed placement engine 1206 so that the detailed placement engine 1206 may refine shape placement within the physical design.

The design tool configuration 1200 further comprises an Ebeam data processor 1214 configured to receive physical design data from the physical design tool 1202, and to send layout partitioning requirements for Ebeam patterning to the detailed placement engine 1206. The design tool configuration 1200 further comprises a library unit 1208 coupled to the physical design tool 1202 and configured to store a plurality of standard cells, a standard cell comprising one or more shapes, wherein the detailed placement engine 1206 is configured to refine standard cell placement in the physical design tool 1202 in accordance with partitioning requirements from the electron-beam data processor 1212. The detailed placement engine 1206 will optimize shape placement by modifying the physical design by steps comprising: shifting standard cells within a physical design, exchanging positions between the plurality of standard within the physical design, communicating to the place and route tool 1212 illegal routing grid positions resulting from layout partitioning for Ebeam lithography by the Ebeam writer 1216.

It will also be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein; such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to a method and apparatus to create a physical layout for electron-beam lithography, comprising defining a layout grid for a physical design, the layout grid further comprising vertical grid lines which coincide with stitching lines resulting from partitioning the physical design into a plurality of subfields. The physical design is assembled in accordance with design restrictions regarding interaction between design shapes and the layout grid. In some embodiments, the design restrictions are realized though layout restrictions. In some embodiments, the design restrictions are realized by shifting standard cells to minimize design shape interaction with the layout grid in a post-layout step. In some embodiments, the design restrictions are realized by exchanging positions between a plurality of standard cells for an exchange permutation which minimizes the number of interactions in a post-layout step. In some embodiments a routing grid is refined to rule out interactions between a subset of design constructs and the layout grid. Remaining design shape placement is then optimized along the routing grid relative to the stitching lines.

In some embodiments the present disclosure relates to a method to create an electron-beam lithography layout. A computer, which is configured to provide an integrated circuit layout made of multiple integrated circuit layers, is used to produce an electronic version of an initial integrated circuit layer made up of one or more design shapes. The initial integrated circuit layer is resolved into a plurality of e-beam subfields. Respective e-beam subfields correspond to respective passes of an electron beam and neighboring e-beam subfields meet at a stitching line which overlaps a length or area on a design shape in the initial integrated circuit layer. The electronic version of the initial integrated circuit layer is modified to produce a modified integrated circuit layer in which the design shape is moved or altered to reduce the length or area of overlap between the design shape and the stitching line relative to the initial integrated circuit layer.

In other embodiments the present disclosure relates to a method to create layout for electron-beam lithography. A computer, which is configured to provide an integrated circuit layout made up of multiple integrated circuit layers, is used to produce an electronic version of an initial integrated circuit layer. The initial integrated circuit layer is made up of one or more design shapes. The initial integrated circuit layer is resolved into a plurality of e-beam subfields. Respective e-beam subfields correspond to respective passes of an electron beam and neighboring e-beam subfields meet at a stitching line which overlaps a length or area of a design shape in the initial integrated circuit layer. The electronic version of the initial integrated circuit layer is selectively modified based on whether the stitching line traverses the design shape. The selective modification produces a modified integrated circuit layer in which the design shape is moved or altered to reduce the overlap between the design shape and the stitching line relative to the initial integrated circuit layer.

What is claimed is:

1. A method to create an electron-beam lithography layout, comprising:
    using a computer, which is configured to provide an integrated circuit layout made of multiple integrated circuit layers, to produce an electronic version of an initial integrated circuit layer made up of one or more design shapes;
    resolving the initial integrated circuit layer into a plurality of e-beam subfields, wherein respective e-beam subfields correspond to respective passes of an electron beam and wherein neighboring e-beam subfields meet at a stitching line which overlaps a length or area on a design shape in the initial integrated circuit layer; and
    modifying the electronic version of the initial integrated circuit layer to produce a modified integrated circuit layer in which the design shape is moved or altered to reduce the length or area of overlap between the design shape and the stitching line relative to the initial integrated circuit layer.

2. The method of claim 1, further comprising:
    using an actual electron beam to write the modified integrated circuit layer, but not the initial integrated circuit layer, onto a semiconductor wafer surface.

3. The method of claim 1, wherein modifying the initial integrated circuit layer to produce the modified integrated circuit layer leaves electronic coupling between design shapes within the integrated circuit layer unchanged and leaves electronic coupling between design shapes on the integrated circuit layer and other layers in the electron-beam lithography layout unchanged.

4. The method of claim 1, wherein movement of the design shape reduces the length or area of overlap to zero between the design shape and the stitching line.

5. The method of claim 1, wherein movement of the design shape reduces, but does not entirely eliminate, the length or area of overlap between the design shape and the stitching line.

6. The method of claim 1, wherein the design shape in the initial integrated circuit layer corresponds to a via and wherein the via is moved in the modified integrated circuit layer to reduce the length or area of overlap to zero.

7. The method of claim 1, wherein the design shape in the initial integrated circuit layer comprises:
    a first segment extending along a first direction in parallel with the stitching line, wherein a first length or first area of overlap between the first segment and the stitching line is an initial non-zero value in the initial integrated circuit layer;
    a second segment abutting the first segment and extending along a second direction perpendicular to the stitching line.

8. The method of claim 7, wherein the design shape is moved or altered in the modified integrated circuit layer so:
    the first segment is translated by a distance in the second direction to reduce the first length or first area of overlap; and
    the second segment is extended by the distance in the second direction so the first segment and second segment remain abutting in the modified integrated circuit layer.

9. The method of claim 7, wherein the first and second segments correspond to a single metal layer.

10. The method of claim 1, wherein the integrated circuit layer comprises a GL1, OASIS, or GDSII data format.

11. A method to create layout for electron-beam lithography, comprising:
    using a computer, which is configured to provide an integrated circuit layout made up of multiple integrated circuit layers, to produce an electronic version of an initial integrated circuit layer, wherein the initial integrated circuit layer is made up of one or more design shapes;
    resolving the initial integrated circuit layer into a plurality of e-beam subfields, wherein respective e-beam subfields correspond to respective passes of an electron beam and wherein neighboring e-beam subfields meet at a stitching line which overlaps a length or area of a design shape in the initial integrated circuit layer; and
    selectively modifying the electronic version of the initial integrated circuit layer based on whether the stitching line traverses the design shape, wherein the selective modification produces a modified integrated circuit layer in which the design shape is moved or altered to reduce the overlap between the design shape and the stitching line relative to the initial integrated circuit layer.

12. The method of claim 11, further comprising:
    using an actual electron beam to write the modified integrated circuit layer, but not the initial integrated circuit layer, onto a semiconductor wafer surface.

13. The method of claim 11, wherein modifying the initial integrated circuit layer to produce the modified integrated circuit layer leaves electronic coupling between design shapes within the integrated circuit layer unchanged and leaves electronic coupling between design shapes on the integrated circuit layer and other layers in the integrated circuit layout unchanged.

14. The method of claim 11, wherein movement of the design shape reduces the length or area of overlap to zero between the design shape and the stitching line.

15. The method of claim 11, wherein movement of the design shape reduces, but does not entirely eliminate, the length or area of overlap between the design shape and the stitching line.

16. The method of claim 11, wherein the design shape in the initial integrated circuit layer corresponds to a via and wherein the via is moved in the modified integrated circuit layer to reduce the length or area of overlap to zero.

17. The method of claim 11, wherein the design shape in the initial integrated circuit layer comprises:
    a first segment extending along a first direction in parallel with the stitching line, wherein a first length or first area of overlap between the first segment and the stitching line is an initial non-zero value in the initial integrated circuit layer;
    a second segment abutting the first segment and extending along a second direction perpendicular to the stitching line.

18. The method of claim 17, wherein the design shape is moved or altered in the modified integrated circuit layer so:
    the first segment is translated by a distance in the second direction to reduce the first length or first area of overlap; and
    the second segment is extended by the distance in the second direction so the first segment and second segment remain abutting in the modified integrated circuit layer.

19. The method of claim 17, wherein the first and second segments correspond to a single metal layer.

20. The method of claim 11, wherein the integrated circuit layer comprises a GL1, OASIS, or GDSII data format.

* * * * *